United States Patent [19]
Fischer

[11] 3,889,394
[45] June 17, 1975

[54] HEAT SHRINK APPARATUS

[75] Inventor: Kenneth J. Fischer, Henderson, Ky.

[73] Assignee: Fox Valley Corporation, Appleton, Wis.

[22] Filed: June 4, 1973

[21] Appl. No.: 366,496

[52] U.S. Cl. .................. 34/225; 34/216; 34/233; 53/184 S
[51] Int. Cl. ............................................ F26b 19/00
[58] Field of Search ............ 34/201, 203, 216, 218, 34/219, 223–227, 233, 236, 228; 53/305, 184, 184 S

[56] References Cited
UNITED STATES PATENTS

| | | | |
|---|---|---|---|
| 3,321,886 | 5/1967 | Griffith et al. ...................... | 53/184 S |
| 3,340,670 | 9/1967 | Anderson et al. ................. | 53/184 S |
| 3,349,502 | 10/1967 | Kiefer .................................. | 34/225 |
| 3,640,049 | 2/1972 | Fritz et al. .......................... | 53/184 S |
| 3,711,961 | 1/1973 | Spiegel et al. ..................... | 34/218 |
| 3,808,702 | 5/1974 | Laessig ............................... | 34/229 |

Primary Examiner—Kenneth W. Sprague
Assistant Examiner—James C. Yeung
Attorney, Agent, or Firm—Kinzer, Plyer, Dorn & McEachran

[57] ABSTRACT

A method and apparatus for heat shrinking a plastic film uniformly around an object without distorting or melting the film. The apparatus for practicing the method includes means for moving a plastic film enclosed object along a defined path and a number of hot air nozzles encircling a portion of the defined path to discharge heated air against a peripheral band of the plastic film at temperatures and pressures that are uniform around the band. In one embodiment, the nozzles are mounted on an annular ring having an opening large enough for the plastic film enclosed object to pass through the ring. A conveyor moves the plastic film enclosed object through the opening in the annular ring with the conveyor being interrupted horizontally at the entrance and exit of the ring so that the heated air discharging from the nozzles contacts the plastic film enclosed object uniformly around a peripheral band thereof.

10 Claims, 4 Drawing Figures

HEAT SHRINK APPARATUS

BACKGROUND AND SUMMARY OF THE INVENTION

Heat shrinkable plastic films have been commonly used to package both single and multiple objects. The objects are loosely enclosed in the film and heat is applied to shrink the film so that it follows the contours of the enclosed objects. Heated air has usually been applied to the film covered objects while they are moving through a tunnel or oven with the heated air applied in jets at relatively high velocity so that the film will shrink uniformly without local overheating which can result in burn spots and distortion.

Due to the necessity of supporting the packaged objects as they pass through the heat shrink tunnels or ovens, it has been difficult to apply heated air uniformly to the film enclosing the packaged objects. A wire mesh belt for supporting the objects is not a complete answer because the belt becomes hot and can cause melting and distortion of the portions of the plastic film which contact the belt. Further, even a wire mesh belt interfers with the uniform discharge of heated air against the plastic film either because it distorts the flow of air or interfers with the proper placement of the heated air discharge outlets or nozzles.

One purpose of this invention is to uniformly shrink a plastic film enclosing an object by directing heated air against the plastic film at temperatures and pressures that are uniform around the portion of the film being heated.

Another purpose of this invention is to transport a film enclosed object past a discharge of heated air in such a manner that heated air can be applied around a portion of said film at uniform temperature and pressure.

Another purpose is to move a film enclosed object rapidly through a discharge of heated air so that uniform shrinkage of the plastic is obtained and little, if any heat, is transferred to the enclosed object.

another purpose is to heat shrink a plastic film tightly around an object by applying heated air at uniform temperature and pressure to the plastic in peripheral bands starting at one end of the object and continuing smoothly and uninterruptedly to the othe end thereof.

These and other features of this invention will be found in the following description, drawings and claims.

BRIEF DESCRIPTION OF THE DRAWINGS

The invention is illustrated more or less diagrammatically in the following drawings wherein.

DESCRIPTION OF THE PREFERRED EMBODIMENT

Figure 1:
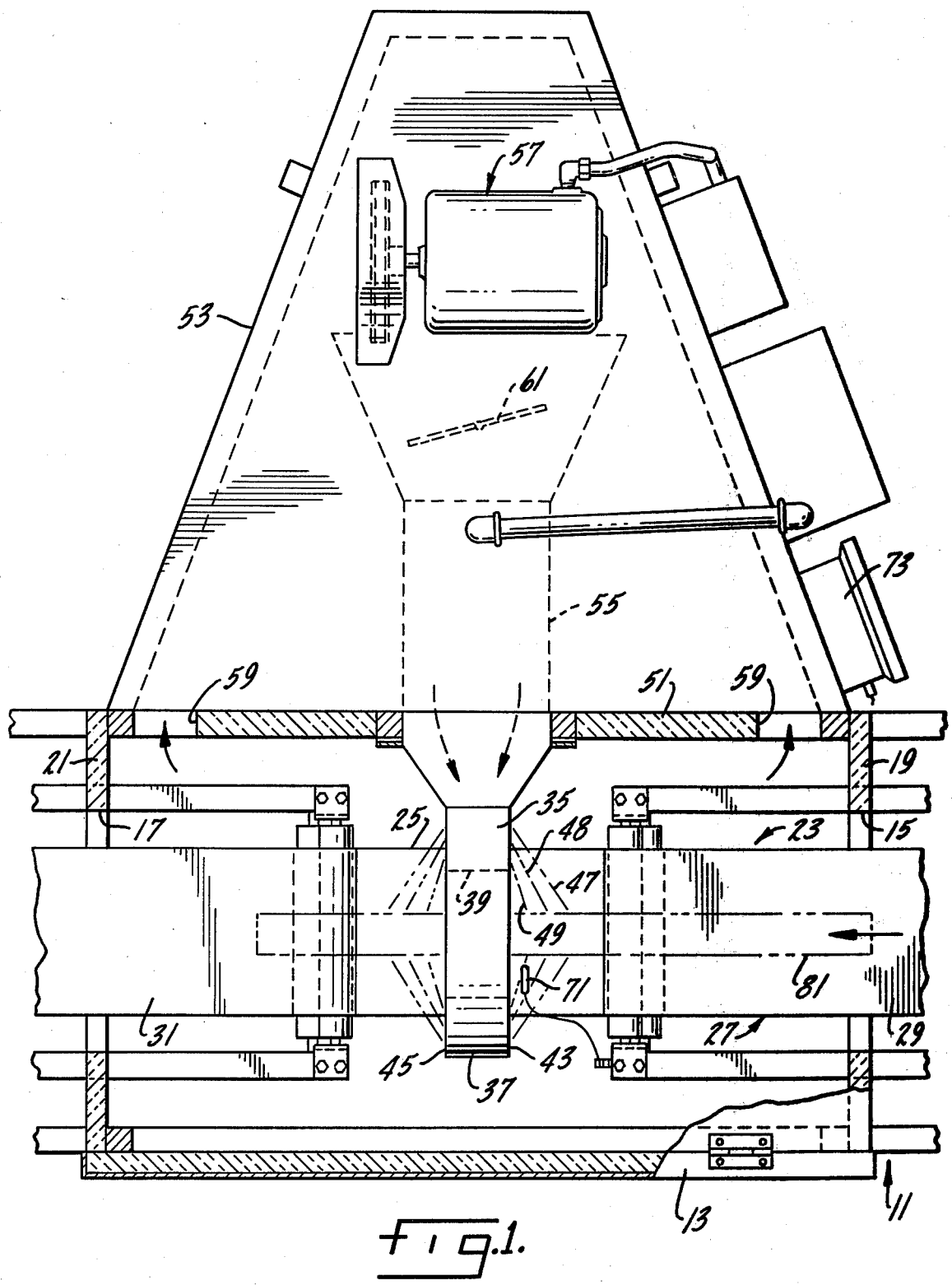
FIG. 1 is a top plan view, partially in cross-section of an apparatus for practicing the method of this invention with parts broken away and others omitted for clarity of illustration.

A preferred form of apparatus for practicing the method of this invention is shown in the drawings. This apparatus includes an insulated housing or tunnel 11 having an insulated front wall 13 which is hinged along the top to provide access to the interior of the housing. Entrance and exit openings 15 and 17 are provided in the end walls 19 and 21 of the housing for a horizontally extending conveyor 23. A portion of the conveyor located inside the housing is lowered thereby providing a horizontal interruption or gap 25 in the conveyor belt 27. The horizontal interruption divides the conveyor belt into a delivery portion 29 and a discharge portion 31. The belt is preferably cupped relative to its longitudinal axis to hold transported objects in the center thereof.

Figure 2:
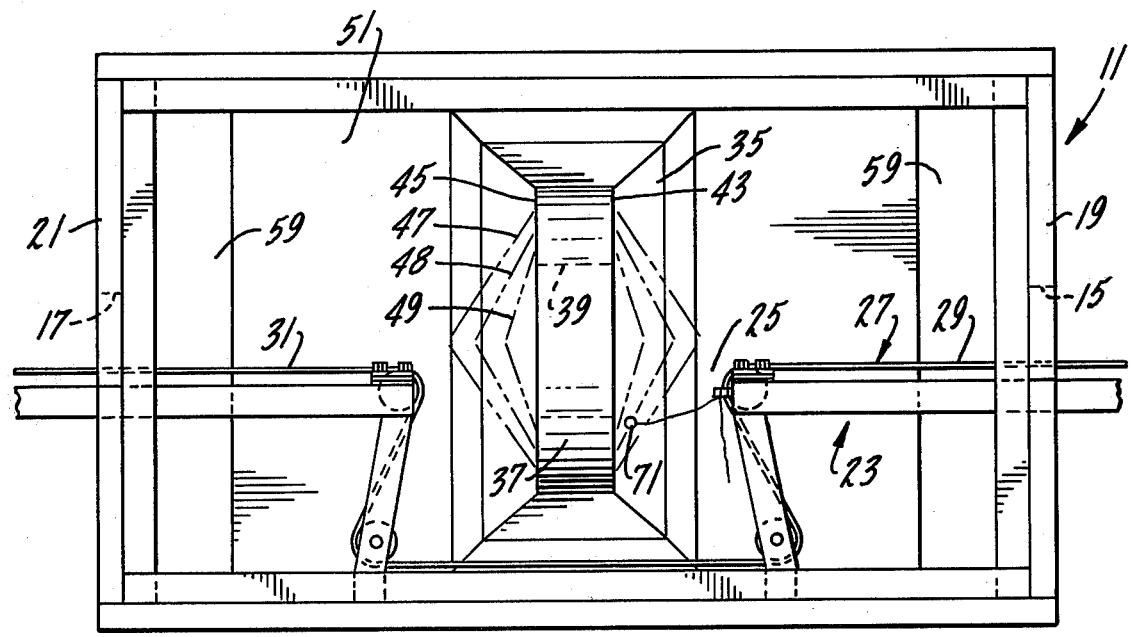
FIG. 2 is a front elevational view of the apparatus of FIG. 1 with some parts omitted.
Figure 3:
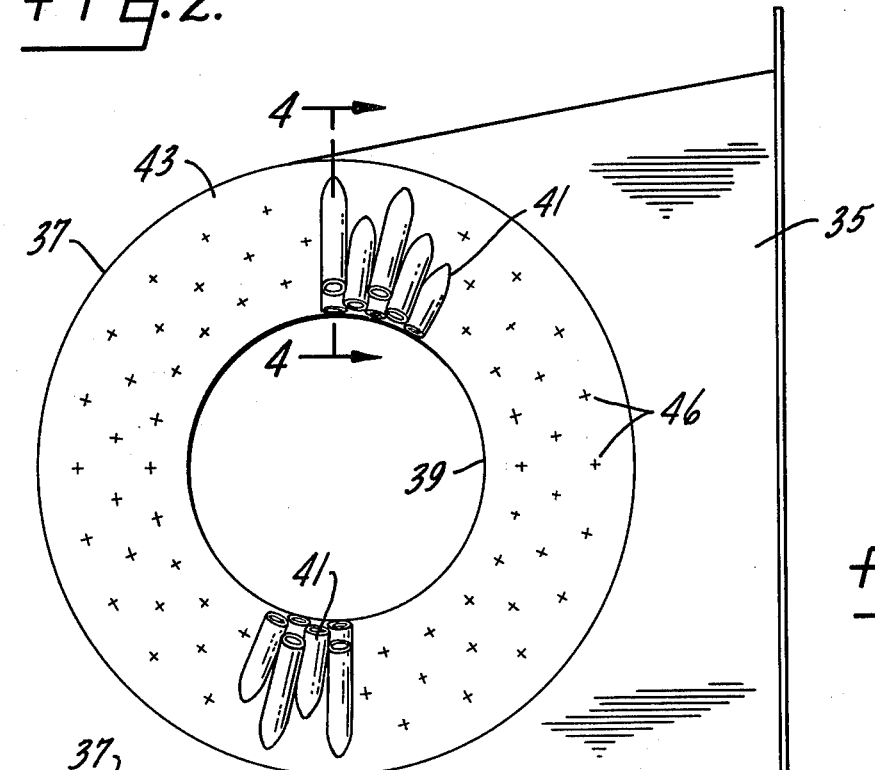
FIG. 3 is an enlarged side elevational view of the heated air discharge means of FIGS. 1 and 2 with most of the nozzles omitted for clarity of illustration.
Figure 4:
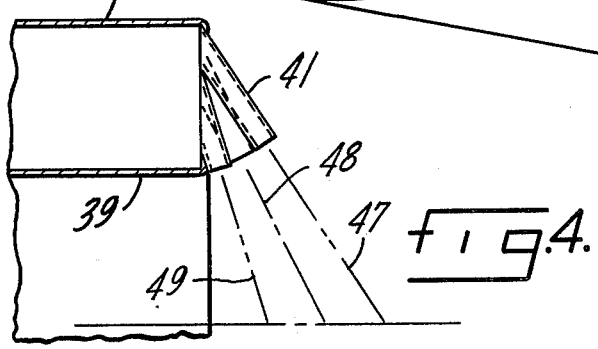
FIG. 4 is a partial cross-sectional view taken along line 4—4 of FIG. 3.

Positioned in the gap 25 in the conveyor 23 is a hot air duct 35 which terminates in a ring 37. An opening 39 through the ring generally aligns with the conveyor. A plurality of nozzles 41 are located on opposite annular faces 43 and 45 of the ring. Only a representative number of these nozzles on one face are shown in FIGS. 3 and 4 and the nozzles have been omitted completely in FIGS. 1 and 2 for clarity of illustration. However, it should be apparent that a nozzle is provided on each face at each location indicated by a mark 46. The nozzles on each annular face of the ring are arranged in three concentric circles with the nozzles inclined both radially inwardly and along the longitudinal axis of the opening 39 through the annular ring. The nozzles are inclined so that the heated air discharging from them will impinge uniformly on the plastic film enclosed objects as they leave and then approach the conveyor belt portions on the opposite sides of the horizontal gap 25 in the conveyor. The path of flow of heated air from the nozzles on the outer circle is indicated by the line 47, while the paths of flow of heated air from the nozzles of the intermediate and inner circles are represented by the lines 48 and 49.

The hot air duct 35 extends through a rear side wall 51 of the housing 11 and and into a compartment 53 in which are located an electric heater 55 and a motor driven blower 57. Returned air openings 59 in the rear side wall 51 of the housing lead to the suction intake of the blower (not shown). An adjustable baffle 61 is located between the blower discharge and the heater 55 to control the amount of air passing through the heater to the duct 35. A temperature sensor 71 is positioned in the housing 11 in the path of flow of heated air from the discharge nozzles 41. The temperature sensor connects to a temperature control mechanism 73 mounted on the compartment 53.

The use, operation and function of this invention are as follows:

The nozzle arrangement of the preferred embodiment of the apparatus shown herein is particularly intended for shrinking a plastic film encasing an elongated cylindrical object 81 of the type shown in phantom in FIG. 1 of the drawings. With objects of different shapes, other arrangements of nozzles would be necessary to apply heated air at uniform temperature and pressure around the portion of the periphery of the plastic film which is moving through the heated air discharged from the nozzles 41. For example, in the case of an object of rectangular transverse cross-section, the nozzles would be arranged in a rectangular configuration similar to the transverse cross-section of the object in question.

Since the object 81 to be enclosed is cylindrical, the nozzles are arranged in concentric circles on the annular faces 43 and 45 of the heat duct ring 37. The inner ring of nozzles which discharge along paths defined by lines 49, are directed more in the radial direction than are the nozzles of the intermediate and outer rings which are successively inclined more in the direction of the axis of the ring opening 39. The outermost circle of nozzles are aligned to discharge heated air on the cylindrical object 81 when its forward end is approximately three-quarters of an inch to an inch into the gap 25 of the conveyor. The intermediate and inner circles of nozzles are aligned to direct heated air against the plastic film enclosing the cylindrical object as it moves through the remaining space between the end of the delivery portion 29 of the belt 27 and the ring 37. To provide even distribution of heated air, the longitudinal axis of the cylindrical object 81 aligns with the longitudinal axis of the opening 39 in the heat duct ring. The nozzles on the opposite face 45 of the ring 37 are arranged in a similar manner to direct heated air against the plastic film enclosing the cylindrical object as it passes through the opening 39 of the ring and moves towards the discharge portion 31 of the conveyor belt 27.

The length of the gap 25 in the conveyor is determined by the length of the object 81 being packaged. The gap length should be less than one-half the length of the object so that the object will not fall when an unsupported portion thereof is traversing the gap.

Both the temperature of the air and the amount of air discharged from the nozzles 41, as well as the speed of the conveyor belt 27 can be varied depending upon the size of the object being packaged and the type of plastic film used. The object of this method is to apply air at equal temperature and pressure against the plastic film in the area thereof moving past the nozzles. The pressure is obtained by the combination of both the velocity of the discharging air and the velocity of the object moving on the conveyor. Using certain types of polyethylene film it has been found that a satisfactory discharge temperature for the air is approximately 325°F. when the air is discharged at the rate of 60 cubic feet per minute from the nozzles and the conveyor is moving in the range of 400 to 700 feet a minute.

While apparatus of the type shown in the drawings is particularly advantageous because of the simplicity of its construction and because it permits an unobstructed portion of the plastic enclosed object to be contacted by heated air from the nozzles, it should be understood that other types of conveying arrangements may be used so long as an unobstructed portion of the plastic film is exposed to the heated air.

I claim:

1. Apparatus for heat shrinking a plastic film enclosing an elongated object,
    said apparatus including:
    means to move an elongated object loosely enclosed in a shrinkable plastic film along a defined path which path is generally coincidental with the longitudinal axis of said elongated object,
    a plurality of nozzles encircling a portion of said path and arranged to discharge heated fluid against a peripheral band of said film as said object moves along said path and past said nozzles,
    said nozzles being arranged in at least one ring with the nozzles of a ring each being spaced generally uniformly around said ring and each being positioned approximately an equal distance from said film to thereby discharge heated fluid against said peripheral band of film at temperatures and pressures which are generally uniform over the area of the peripheral band,
    said nozzles being arranged to discharge said heated fluid against said film enclosing said elongated object with said heated fluid discharging in a direction opposite and obliquely to the path of movement of said film enclosed object.

2. The apparatus of claim 1 in which said means to move said object along a defined path includes means to sequentially expose unobstructed peripheral bands of said plastic film to the heated fluid discharged from said nozzles.

3. The apparatus of claim 1 in which said nozzles are mounted on one side of an annular housing and said path of movement of said object passes through the opening of said annular housing.

4. The apparatus of claim 1 in which said nozzles are located on two opposite sides of an annular housing, said path of movement of said plastic film enclosed object passes through the opening of said annular housing and the nozzles on one side of said housing are arranged to discharge heated fluid against said film enclosed object in a direction opposite and oblique to the direction of movement of said film and the nozzles on the other side of said housing are arranged to discharge heated fluid against said film enclosed object in the direction of movement of said object and also obliquely to the direction of movement of said object.

5. The apparatus of claim 1 in which means are provided for heating and pressurizing said fluid and said nozzles are located in a housing provided with means to return the heated fluid from said housing to said means for heating and pressurizing said fluid.

6. The apparatus of claim 1 in which said means to move said object along a defined path is a horizontal conveyor which is interrupted at said nozzles and which has a delivery portion carrying the object to the nozzles and a discharge portion carrying said object away from said nozzles.

7. The apparatus of claim 6 in which the interruption in the horizontal conveyor is less than half the length of an object being moved along said conveyor.

8. The apparatus of claim 1 in which said nozzles are located in a circle.

9. The apparatus of claim 1 in which said nozzles are positioned in a configuration similar to the transverse configuration of said plastic film enclosed object being transported along said defined path.

10. The apparatus of claim 1 in which said object is moved along said defined path at the rate of 400 to 700 feet per minute.

* * * * *